W. DONLEY & C. PAUL.
GAS BURNER.
APPLICATION FILED JUNE 4, 1910.
974,040.
Patented Oct. 25, 1910.
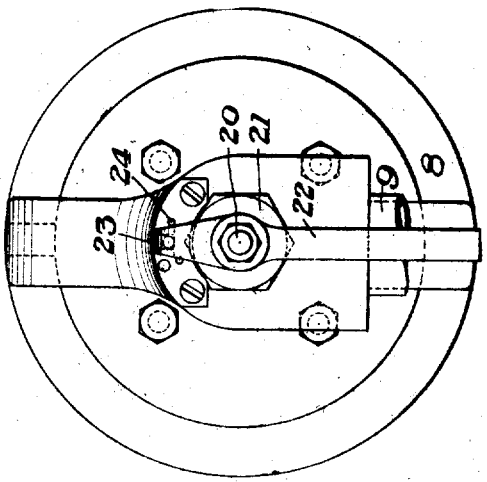
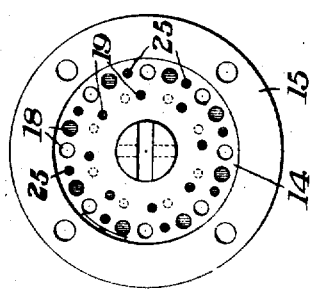
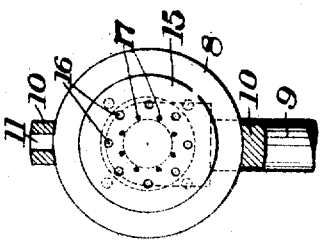
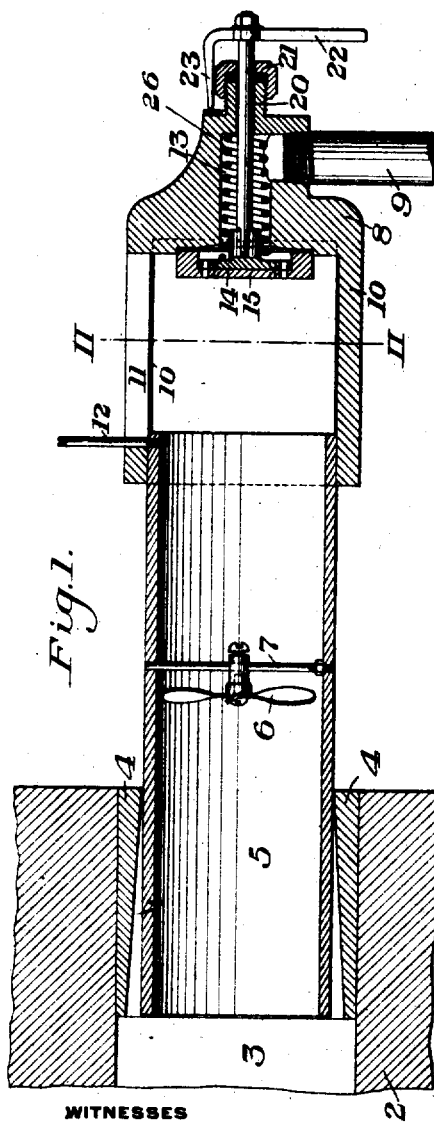
WITNESSES
INVENTORS
Wm Donley
Clyde Paul.

UNITED STATES PATENT OFFICE.

WILLIAM DONLEY AND CLYDE PAUL, OF WASHINGTON, PENNSYLVANIA; SAID PAUL ASSIGNOR TO SAID DONLEY.

GAS-BURNER.

974,040.

Specification of Letters Patent. Patented Oct. 25, 1910.

Application filed June 4, 1910. Serial No. 565,082.

*To all whom it may concern:*

Be it known that we, WILLIAM DONLEY and CLYDE PAUL, both residents of Washington, in the county of Washington, and State of Pennsylvania, have invented a new and useful Improvement in Gas-Burners, of which the following is a full, clear, and exact description, reference being had to the accompanying drawings, forming part of this specification, in which—

Figure 1 is a longitudinal section of a gas burner embodying our invention; Fig. 2 is a section on the line II—II of Fig. 1; Fig. 3 is a plan view of the valve members removed and on a larger scale; and Fig. 4 is an end view of the burner also on a larger scale.

Our invention has relation to gas burners and is designed to provide a burner which will be highly efficient in its action; which is provided with simple means for giving different volumes of gas; which also has means of simple and convenient character for adjusting the supply of air; and also provides means of novel character for mixing the air and gas prior to combustion.

The nature of our invention will be best understood by reference to the accompanying drawings, in which we have shown the preferred embodiment thereof and which will now be described, it being premised, however, that various changes may be made in the details of construction and arrangement of the parts, without departing from the spirit and scope of the invention, as defined in the appended claims.

In these drawings, the numeral 2 designates a portion of a furnace wall having an opening 3 therein, to receive the burner.
This opening is preferably provided with a guiding and supporting sleeve 4, which receives the mixer tube 5 of the burner. The interior of the sleeve 4 is preferably of an increasing diameter toward its inner end, so that the mixer tube 5 can slide easily therethrough, without binding. This mixer tube is open at both its inner and outer ends, and is provided intermediate of its ends with a mixing fan 6, which is journaled on a suitable supporting bar or spider 7.

8 is the head of the burner, having connected thereto a gas supply pipe 9, which is provided with the diametrically opposite forwardly extending legs 10, which embrace the outer end portion of the mixer tube, one of said legs being slotted, as shown at 11, to receive a guide pin 12, projecting from the tube. The head is provided with the interior chamber 13, communicating with the gas supply pipe 9, and which is closed at its inner end by means of the valve members 14 and 15. The valve member 15 consists of a plate having a recess in its rear face to receive the valve member 14, which is in the form of a disk. The member 15 is provided with one series of relatively large perforations 16 and with an inner series of relatively small perforations 17. The valve member 14 is formed with an outer series of relatively large perforations 18. There are twice as many of these perforations 18 as there are perforations 16. The member 14 also has an inner series of relatively small perforations 19. Connected to the valve member 14 is a stem 20, which projects rearwardly through a suitable stuffing box 21, and is provided at its outer end with an operating wrench or lever 22, one end of which forms or is provided with a forwardly extending pointer 23, which is designed to indicate the setting of the valves. The end of the casing is provided with indents or other marks 24, with which this pointer coöperates.

The operation will be readily understood.
The gas entering the burner head from the supply pipe 9 passes through the perforations of the valve members in a series of jets which are directed forwardly into the rear end of the mixer tube, air being drawn in through the open rear end of said tube. It will be noted that the space between the rear end of the tube and the valve member 15 is entirely open except for the forwardly projecting legs 10 of the head.
There is, therefore, a large inlet area for the air which will be drawn in by the suction action of the burner. The volume of this air can be controlled by moving the mixer tube so as to vary the distance between its outer end and the valve member 15. The inrushing current of gas and air strikes the fan wheel 6, causing a rapid revolution thereof, which gives a very complete mixing of the air and gas prior to combustion.

In the position shown in Figs. 2 and 3, the valve member 14 is so set relatively to the valve member 15 as to cause one-half of the perforations 18 to register with the perforations 16. This adjustment gives a supply of gas which is intermediate the minimum and the maximum supply. To obtain a maximum supply of gas, the valve member 14 is rotated to the left (looking at Fig. 3) thereby bringing the perforations 19 into register with the perforations 17, and one-half of the perforations 18 into line with the perforations 16. The valve member 14 is also provided with another series of perforations 25, intermediate the perforations 18, and by turning the valve 14 to the right (looking at Fig. 3) these small perforations may be brought into line with the perforations 16 of the valve member 15, the perforations 18 being cloesd.

Actual practical use of our improved burner has shown extremely satisfactory results, since it effects a considerable saving of gas. The adjustment giving different volumes of gas is an important feature, since by the arrangement described the gas is not throttled until it reaches the valve members 14 and 15, and therefore, passes through these perforations with full velocity in each of the different adjustments. These adjustments enable the burner to be set to give the desired amount of heat. Another important feature of our invention is the construction by which the air is introduced and intimately mixed with the gas, prior to combustion, there being a large and readily adjustable air inlet area, and the fan 6 forming very effective means for mixing the air and gas.

It will be obvious that various changes can be made in the details of construction and arrangement of the parts. Thus, the valve members may be differently constructed and operated, changes may be made in the form of the head, and other details may be changed. The spring 26 may be used to hold the valve members in contact.

What we claim is:

1. A gas burner, comprising a head having a gas admission chamber therein, and a valve controlling the discharge from said chamber, said valve having two relatively movable members, each of which has a plurality of gas discharge perforations therethrough and disposed around the center of the burner, said perforations being arranged in series of different sizes, and means for moving one of said members relatively to the other to bring different series of perforations into register and thus provide for different effective areas of said perforations, substantially as described.

2. A gas burner comprising a head having a gas admission chamber therein, and a valve controlling the discharge from said chamber, said valve having two relatively movable members, each of which has a plurality of gas discharge perforations therethrough and disposed around the center of the burner, said perforations being arranged in series of different sizes, and means for moving one of said members relatively to the other to bring different series of perforations into register and thus provide for different effective areas of said perforations, together with means whereby a controllable amount of air may be mixed with the gas subsequent to its discharge from the said perforations, substantially as described.

3. A gas burner, comprising a head having a gas admission chamber therein, and a valve controlling the discharge from said chamber, said valve having two relatively movable members, each of which has therein series of perforations of different sizes, said perforations being disposed around the center of the burner, a mixing space forward of said valve and into which the valve discharges, said space having lateral air inlet openings, and a member movable longitudinally toward and away from the gas discharge to vary the area of said openings or to close them entirely; substantially as described.

In testimony whereof, we have hereunto set our hands.

WILLIAM DONLEY.
CLYDE PAUL.

Witnesses:
ALVAN DONNAN,
MINNIE A. LEONARD.